United States Patent Office 3,577,553
Patented May 4, 1971

3,577,553
COMPOSITIONS AND METHODS FOR CONTROLLING COCCIDIOSIS IN POULTRY EMPLOYING TRIAZOLE DERIVATIVES
Robert J. Ferlauto, Perkasie, Pa., assignor to Smith Kline & French Laboratories, Philadelphia, Pa.
No Drawing. Filed Jan. 29, 1969, Ser. No. 795,043
Int. Cl. A61k 27/00
U.S. Cl. 424—269
10 Claims

ABSTRACT OF THE DISCLOSURE

Chemotherapeutic compositions useful for the prevention and control of coccidiosis comprising adducts between a benzaldehyde or a cinnamaldehyde and an aminotriazole or between an alkyl aryl ketone and an aminotriazole, optionally substituted in the aromatic ring, are described as specific and novel compounds useful for the prevention and control of coccidiosis.

---

This invention relates to compounds which are useful as anticoccidal agents when administered to poultry. In another aspect it relates to novel feed compositions useful for the prevention and control of coccidiosis in poultry and the growth-promoting effects produced thereby. In still another aspect it relates to a new and useful method for the control of coccidiosis in poultry.

In poultry, coccidiosis is a widespread disease of considerable economic importance due to its destructiveness in the form of severe intestinal infections which are often fatal. The disease is produced by protozan organisms known as coccidia, and in particular by a certain species of the genus Eimeria, such as, for example, *Eimeria tenella*.

The compositions of this invention make possible the control of coccidiosis by preventing, checking and or curing said disease. Control of the disease is accomplished by administering the compositions of the invention to poultry in effective quantities. By preventing, checking and/or curing said disease, the compositions can also exert a growth-promoting action in poultry, and accordingly, are also useful as growth-promoting agents.

The anticoccidial compositions of the invention consist of a physiologically acceptable carrier material, such as solid or liquid poultry feed containing an efficacious concentration of a compound of generic Formula I below. These compositions control coccidiosis by preventing, checking and/or curing said disease. The anticoccidal compounds are defined in the generic formula:

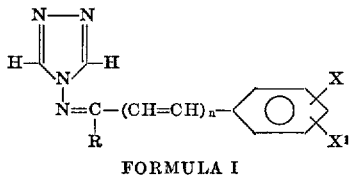

FORMULA I wherein:

X and X' are the same or different and consist of hydrogen; alkyl, straight or branched up to five carbon atoms; alkoxy straight or branched up to five carbon atoms; trifluoromethyl; trifluoromethoxy; halo, such as fluoro, chloro, bromo, and iodo; nitro and alkylthio; having one to five carbon atoms;

R is hydrogen, alkyl to five carbons, or haloalkyl to five carbons; and n is equal to zero or one.

It is preferred to use as an active ingredient of the novel anticoccidia compositions, compounds as shown in Formula II below:

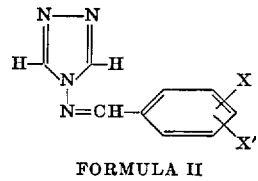

FORMULA II wherein X and X' are the same or different and consist of hydrogen, halo, such as fluoro, chloro, bromo, and iodo; and nitro.

The most advantageous members of Formula II are those where X and X' are the same or different and consist of hydrogen, fluoro, chloro, bromo, iodo, alkyl to three carbons, alkoxy to three carbons or nitro.

The compounds of this invention (Formula I) wherein R is hydrogen and n is zero, are prepared by heating a mixture of the appropriately substituted benzaldehyde and 4-amino-4H-1,2,4-triazole, alone or in the presence of an inert solvent, to form the corresponding benzylidene adduct (Formula I, R=H, n=0).

Compounds of Formula I wherein R is lower alkyl and n is zero are prepared by treating the appropriately substituted 4-amino-4H-1,2,4-triazole with the appropriately substituted phenyl alkyl ketone, alone or in the presence of an inert solvent, to form the corresponding adduct (Formula I, R=alkyl, n=0).

Compounds of Formula I wherein R is hydrogen and n is one, are prepared by treating the appropriately substituted 4-amino-1,2,4-triazole with the appropriately substituted cinnamaldehyde, alone or in the presence of an inert solvent, to form the corresponding adduct (Formula I, R=H, n=1).

Certain adducts of this invention are reported in the literature. However, the here disclosed activity was not suggested in any of these publications.

See F. Zajdela et al., Acta Union Inter. Contra. Cancrum, 20 (1–2), 233–9 (1964) C.A. 878a; and Becker et al., Z. Chem. 4(8), 304–5 (1964)–C.A. 61:13232g.

EXAMPLES OF SPECIFIC COMPOUNDS FALLING WITHIN FORMULA I 4-(2'-chlorobenzylideneamino)-4H-1,2,4-triazole
4-(3'-chlorobenzylideneamino)-4H-1,2,4-triazole
4-(4'-chlorobenzylideneamino)-4H-1,2,4-triazole
4-(2'-bromobenzylideneamino)-4H-1,2,4-triazole
4-(3'-bromobenzylideneamino)-4H-1,2,4-triazole
4-(4'-bromobenzylideneamino)-4H-1,2,4-triazole
4-(2'-iodobenzylideneamino)-4H-1,2,4-triazole
4-(3'-iodobenzylideneamino)-4H-1,2,4-triazole
4-(4'-iodobenzylideneamino)-4H-1,2,4-triazole
4-(4'-fluorobenzylideneamino)-4H-1,2,4-triazole
4-(2',4'-dichlorobenzylideneamino)-4H-1,2,4-triazole
4-(2',6'-dichlorobenzylideneamino)-4H-1,2,4-triazole
4-(2',6'-dibromobenzylideneamino)-4H-1,2,4-triazole
4-(4'-methylbenzylideneamino)-4H-1,2,4-triazole
4-(2',6'-dimethylbenzylideneamino)-4H-1,2,4-triazole
4-(2'-methyl-3'-bromobenzylideneamino)-4H-1,2,4-triazole
4-(4'-trifluoromethylbenzylideneamino)-4H-1,2,4-triazole
4-(4'-trichloromethylbenzylideneamino)-4H-1,2,4-triazole
4-(2'-nitrobenzylideneamino)-4H-1,2,4-triazole
4-(3'-nitrobenzylideneamino)-4H-1,2,4-triazole
4-(4'-nitrobenzylideneamino)-4H-1,2,4-triazole
4-(2',4'-dinitrobenzylideneamino)-H,1,2,4-triazole
4-(2',6'-dinitrobenzylideneamino)-4H-1,2,4-triazole
4-(2'-nitro-4'-fluorobenzylideneamino)-4H-1,2,4-triazole
4-(3'-chloro-4'-nitrobenzylideneamino)4H-1,2,4-triazole
4-(4'-trifluoromethoxybenzylideneamino)-4H-1,2,4-triazole 4-(4'-bromo-2'-nitrobenzylideneamino)-4H-1,2,4-triazole
4-(4'-chloro-2'-nitrobenzylideneamino)-4H-1,2,4-triazole
4-(4'-bromo-2'-nitrobenzylideneamino)-4H-1,2,4-triazole
4-(4'-fluoro-2'-nitrobenzyleneamino)-4H-1,2,4-triazole
4-(2'-methylthiobenzylideneamino)-4H-1,2,4-triazole
4'-(4'-trifluoromethylsulfonylbenzylideneamino)-4H-1,2,4-triazole
4'-(4'-methoxybenzylideneamino)-4H-1,2,4-triazole
4'-(4'-n-butoxybenzylideneamino)-4H-1,2,4-triazole
4-[4'-(2''-bromethoxy) benzylideneamino)-4H-1,2,4-triazole
4-($\alpha$-methyl-4'-bromobenzylideneamino)-4H-1,2,4-triazole
4-($\alpha$-methyl-2'-nitrobenzylideneamino)-4H-1,2,4-triazole
4-($\alpha$-ethyl-2'-chlorobenzylideneamino)-4H-1,2,4-triazole
4-($\alpha$-methyl-4'-chlorobenzylideneamino)-4H-1,2,4-triazole
4-[$\alpha$-(2''-bromoethyl)-4'-bromobenzylideneamino]-4H-1,2,4-triazole
4-($\alpha$-trifluoromethyl-2'-chlorobenzylideneamino)-4H-1,2,4-triazole
4-(4'-bromocinnamylideneamino)-4H-1,2,4-triazole
4-(3'-trifluoromethylsulfonylcinnamulideneamino)-4H-1,2,4-triazole
4-[1-(4-nitrophenyl) ethylideneamino]-4H-1,2,4-triazole The compositions of the invention are prepared by mixing Compounds of Formula I in uniform and finely divided form in a liquid or solid feed, or dispersing them in poultry drinking water. Standard commercial poultry feed products can be used as the liquid or solid feed. Additionally other compositions containing ingredients suitable for poultry nutrition can also be employed, such as, animal feed products. For controlling coccidiosis in poultry, the instant compositions contain between about 0.005 and about 0.050 weight percent, based on total feed weight, preferably from about 0.0125 to about 0.0250 weight percent, of the described compounds. In special cases it may be convenient to use concentrations which are smaller or larger than the preferred values named above, depending upon the age, weight and type of poultry.

A uniform distribution of the active compounds in the carrier material can easily be effected according to the usual methods, by mixing, grinding, stirring them with solid feed, or by spraying dilute solutions or suspensions of them onto feed.

Most of these compounds are not water soluble. Therefore, for the manufacture of aqueous preparations, an aqueous dispersion must be prepared using the usual emulsifiers. As emulsifiers, the nonionic emulsifiers are prepared, e.g., polyoxyethylene sorbitan monooleate or laurate, or polyoxyethylene ricinoleate, etc.

When a feed in which the compounds have been incorporated in accordance with the invention is administered to poultry, an undisturbed feed uptake is observed, even after infection with sporulated oocysts. The general conditions of the poultry remains unaltered, and no clinical manifestation is observed.

In another embodiment of the invention, the compounds can also be utilized in compositions in the form of concentrates which then, as additives, are diluted with the basic feed prior to feeding. The compositions in the form of concentrates contain the above compounds in concentrations of about 5 to 95 percent, preferably about 10 to 25 weight percent of the weight of concentrate, the remainder being a physiologically acceptable carrier material, such as those employed above, or one or more of the following: grain, side products of the milling industry, ground oil cake, distillation residues of the fermentation industry, finely divided mineral materials, ground oyster shell, silicon dioxide, etc. Fats, oils, antioxidants and surface active materials can also be employed as the carrier material for these concentrates.

EXAMPLE 1

On Day 0, eleven day old unsexed "Moyers" breed birds are received from Moyer's chucks poultry farm. The birds are culled and placed in cages, four birds to a cage. They are weighed and put on different medicated diets as described below, except the untreated controls.

On Day 1, the birds are infected orally with 100,000 sporulated oocysts/bird of Eimeria tenella (to produce about 50% mortality in the infected controls). The inoculum was quantum sufficiated to 1 ml.=100,000 oocysts. A 5 to 10 ml. pipete with a wide orifice is used, per os administration.

2 sets of 4 birds each were used in each below category

Uninfected controls
Infected but not treated controls
Amprolium plus (Merck) 0.025% diet
Amprolium plus (Merck) 0.003125% diet
Candidate coccidiostats: 0.050, 0.025%, 0.0125%, 0.0625% of diet.

Day 3 individual cages are removed from racks and weighed. These weights are then recorded.

Day 7 the birds are sacrificed and the group weight is recorded. A gross inspection of the ceca is performed and scored according to the following key:

0=Normal cecum
1=Light infection—No thickening, less than 10 lesions
2=Moderate infection—Thickening, less than 20 lesions
3=Heavy infection—More than 20 lesions, coring, blood
4=Death (after 120 hours)

Then the data is calculated for cecal score and percent infection.

$$\text{Cecal score} = \frac{\text{Total score of group}}{\text{Number of birds in group}}$$

$$\text{Percent infection} = \frac{\text{Cecal score}}{4 \text{ (highest possible cecal score)}}$$

After the computation of average weight; average weight; average weight gain, cecal score, and percent infection this information is listed on a permanent record in the following manner:

(1) Marginally active compounds (infectivity reduced less than 50%)
(2) Active compounds (Infectivity reduced more than 50%)
(3) Toxic compounds (Characterized by weight loss, good deal of feed remaining, non-coccidial death of 2 or more birds)
(4) Repeat compounds
(5) Controls Compounds which show activity (50%) are repeated at the same dosage level (0.05%), if activity is again observed, compounds may be titrated down at .025, .0125 and .00625%. Compounds which are toxic are repeated at half dosage level. (0.025%).

Day 3 individual cages are removed from racks and weight. These weights are then recorded.

Day 7 the birds are sacrificed and the group weight is recorded. A gross inspection of the ceca is performed and scored according to the following key:

PROCEDURE FOR PREPARATION OF COCCIDIAL DIETS

Prior to mixing the diets, Quaker Oats "Full O' Pep" Chick Starter Feed is weighed out in 1 kilo quantities and put in flat polyethylene 12" x 18" .002 bags.

The basal diet is a plain feed, in which there is *no Coccidiostat added*. A premix is prepared by adding 500 mg. of the test compounds into approximately 50 grams of the basal diet. Compound(s) are triturated with feed by mortar and pestle to obtain a homogeneous mixture.

The premix was added to 950 grams of basal diet in a polyethylene container, placed on a multiple diet mixer (capacity to mix 20 diets simultaneously) and allowed to run for 1 hour. The final concentration of the test compound in the diet is 0.05%. Lower concentrations were prepared by admixing appropriate ratios of basal diet with the 1000 g. batches, or aliquots thereof, of this 0.05% medicated feed.

EXAMPLE 2

Preparation of 4-(2'-chlorobenzylideneamino)-4H-1,2,4-triazole 2-chlorobenzaldehyde (3.4 g., 0.025 mole) and 4-amino-4H-1,2,4-triazole (2.1 g., 0.025 mole) are refluxed for 6 hours in 15 ml. of absoluted ethanol. A small amount of diethyl ether is added and the precipitated product is collected by filtration. Recrystallization from a suitable solvent (e.g. ethanol) gives analytically pure product, M.P. 131°. The ultraviolet spectrum shows two bands at 211 m$\mu$ and 276 m$\mu$ (conc. 3×10$^{-5}$ M in methanol).

Elem. analysis.—Calcd. for $C_9H_7ClN_4$ (percent): C, 52.31; H, 3.41; N, 27.12. Found (percent): C, 52.15; H, 3.50; N, 27.36.

EXAMPLE 3

Preparation of 4-(3'-nitrobenzylideneamino)-4H-1,2,4-triazole

Substituting an equimolar quantity of 3-nitrobenzaldehyde in the synthetic procedure of Example 1 gives the adduct 4-(3'-nitrobenzylideneamino-4H-1,2,4 - triazole, M.P. 234° [1] (recrystallized from methanol).

EXAMPLE 4

Preparation of 4-(4'-bromobenzylideneamino)-4H-1,2,4-triazole

Substituting an equimolar quantity of 4-bromobenzaldehyde in the synthetic procedure of Example 1 gives the adduct 4-(4'-bromobenzylideneamino-4H-1,2,4 - triazole, M.P. 217–17° (recrystallized from ethanol).

EXAMPLE 5

Preparation of 4-(2'-bromobenzylideneamino)-4H-1,2,4-triazole

Substituting an equimolar quantity of 2-bromobenzaldehyde in the synthetic procedure of Example 1 gives the adduct 4-(2'-bromobenzylideneamino)-4H-1,2,4-triazole, M.P. 134–36° (recrystallized from ethanol).

EXAMPLE 6

Preparation of 4-(3'-bromobenzylideneamino)-4H-1,2,4-triazole

Substituting an equimolar quantity of 3-bromobenzaldehyde in the synthetic procedure of Example 1 gives the adduct 4-(3'-bromobenzylideneamino)-4H-1,2,4-triazole, M.P. 183–184° [2].

Analysis.—Calcd. for $C_9H_7BrN_4$ (percent): C, 43.07; H, 2.81; N, 22.32. Found (percent): C, 42.86; H, 2.90; N, 22.51.

EXAMPLE 7

Preparation of 4-(2',6'-dichlorobenzylideneamino)-4H-1,2,4-triazole

Substituting an equimolar quantity of 2,6-dichlorobenzaldehyde in the synthetic procedure of Example 1 gives 4-(2',6'-dichlorobenzylideneamino)-4H-1,2,4 - triazole, M.P. 130–32° [3] (recrystallized from water).

Analysis.—Calcd. for $C_9H_6Cl_2N_4$ (percent): C, 44.85; H, 2.51; N, 23.25. Found (percent): C, 44.74; H, 2.53; N, 23.19.

EXAMPLE 8

Preparation of 4'-(4'-bromocinnamylideneamino)-4H-1,2,4-triazole

Substituting an equimolar quantity of p-bromo-cinnamaldehyde in the synthetic procedure of Example 1 gives 4-(4'-bromocinnamylideneamino-4H-1,2,4-triazole, M.P. 220–222° (recrystallized from ethanol).

EXAMPLE 9

Preparation of 4-(α-methyl-4'-chlorobenzylideneamino-4H-1,2,4-triazole

Substituting an equimolar quantity of p-chloroacetophenone in the synthetic procedure of Example 1, gives 4-(α-methyl-4'-chlorobenzylideneamino)-4H - 1,2,4 - triazole, M.P. 152–3° (recrystallized from water).

| Compound | Percent infectivity remaining at concentration level in feed (percent by wt.) | | |
|---|---|---|---|
| | 0.05 | 0.025 | 0.0125 |
| 4-(2'-chlorobenzylideneamino-4H-1,2,4-triazole | [1] 10 | 50 | 75 |
| 4-(2',6'-dichlorobenzylideneamino)-4H-1,2,4-triazole | [1] 10 | 63 | 75 |
| 4-(3'-nitrobenzylideneamino)-4H-1,2,4-triazole | 0 | 63 | 75 |
| 4-(3'-bromobenzylideneamino)-4H-1,2,4-triazole | [1] 19 | 75 | 81 |
| 4-(4'-bromobenzylideneamino)-4H-1,2,4-triazole | 0 | 0 | 44 |
| 4-(2'-bromobenzylidene-4H-1,2,4-triazole | [1] 25 | 63 | 69 |
| 4-(2'-nitro-4'-fluorobenzylideneamino)-4H-1,2,4-triazole | [1] 56 | [2] | [2] |
| 4-(3'-iodobenzylideneamino)-4H-1,2,4-triazole | [1] 13 | [2] | [2] |
| 4-(2'-iodobenzylideneamino)-4H-1,2,4-triazole | [1] 37 | [2] | [2] |

[1] Replicated, average value.
[2] Not tested this level.

What is claimed is:

1. A composition for controlling coccidiosis in poultry, which comprises an orally ingestible poultry feed carrier and admixed therein an effective but non-toxic amount of a coccidiostatic agent of the formula:

Formula I

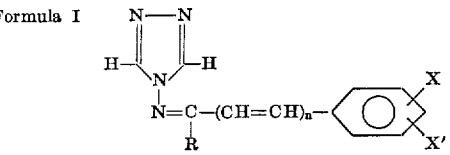

wherein:
X and X' are one of hydrogen; alkyl, straight or branched up to 5 carbon atoms; alkoxy, straight or branched up to five carbon atoms; $CF_3$—; —$OCF_3$; halo, nitro; and alkylthio having one to five carbon atoms.

R is hydrogen, alkyl to five carbons, or haloalkyl to five carbons; and n is equal to zero or one.

2. A composition of claim 1 wherein X and X' are one of the group consisting of hydrogen; halo; and nitro; R is hydrogen; and n is equal to zero.

3. A composition of claim 1 having an agent of said formula wherein R, X, Y and Z are hydrogen, n is zero, and X' is p-bromo.

4. A composition of claim 1 having an agent of said formula wherein R, X, Y and Z are hydrogen, n is zero, and X' is m-bromo.

5. A composition of claim 1 having an agent of said formula wherein R, X, Y and Z are hydrogen, n is zero.

6. A composition of claim 1 having an agent of said formula wherein R, X, Y and Z are hydrogen, n is zero, and X' is m-nitro.

7. A composition of claim 1 having an agent of said formula wherein R, X, Y and Z are hydrogen, n is zero, X' is o-chloro.

8. A composition of claim 1 having an agent of said formula wherein R, Y and Z are hydrogen, n is zero, and X and X' are 2',6'-dichloro.

---

[1] S. Ruheman and R. W. Merriman, J. Chem. Soc., 87, 1768 (1905) reported M.P. 235°.
[2] H. G. O. Becker, H. Hubner, H. J. Timpe and M. Wahren, Tetrahedron, 24, 1031 (1968), reported M.P. 191°.
[3] Chem. Abstrs. 64, 11132 g (1966), "Benzaldehyde N,N-dialkylhydrazones" Shell International Research, Maatschappif, Brit. Pat. 1,019,120 (Cl. 07 cd); Feb. 2, 1966.

9. A method for controlling coccidiosis in poultry, which comprises orally administering to said poultry an effective amount of a composition comprising an orally ingestible carrier and admixed therein a compound of the formula:

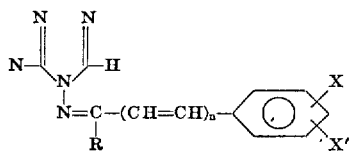

wherein:

X and X' are one of hydrogen; alkyl, straight or branched up to 5 carbon atoms; alkoxy, straight or branched up to five carbon atoms; $CF_3-$; $-OCF_3$; halo, nitro; and alkylthio having one to five carbon atoms.

R is hydrogen, alkyl to five carbons, or haloalkyl to five carbons; and $n$ is equal to zero or one.

10. A method of claim 9 having an agent of said formula wherein X and X' are one of hydrogen, halo or nitro.

References Cited

Becker et al., Chem. Abst., vol. 61 (1964), page 13232g.

SAM ROSEN, Primary Examiner